(12) United States Patent
VanderVelde et al.

(10) Patent No.: US 6,903,265 B1
(45) Date of Patent: Jun. 7, 2005

(54) HINGED AND LATCHED RACEWAY

(75) Inventors: Charles VanderVelde, Frankfort, IL (US); Randall T. Woods, St. Charles, IL (US); Rodney G. Rouleau, Manhattan, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 10/855,136

(22) Filed: May 27, 2004

(51) Int. Cl.⁷ .................................................. H02G 3/04
(52) U.S. Cl. ...................... 174/48; 174/68.1; 174/68.3; 174/72 R; 220/3.3; 220/3.8
(58) Field of Search ................. 174/48, 65 R, 174/68.3, 95, 99 R, 72 A, 72 R, 72 C, 97, 96, 49, 60, 67, 98, 100, 101, 68.1; 52/220.1, 220.3, 220.5, 220.7, 239; 220/3.2, 3.3, 3.8, 4.02

(56) References Cited

U.S. PATENT DOCUMENTS

| | | | |
|---|---|---|---|
| 3,485,937 A | | 12/1969 | Caveney |
| 3,786,171 A | * | 1/1974 | Shira ......................... 174/72 C |
| 4,640,314 A | | 2/1987 | Mock |
| 4,942,271 A | * | 7/1990 | Corsi et al. .................. 174/101 |
| 5,134,250 A | | 7/1992 | Caveney et al. |
| 5,235,136 A | * | 8/1993 | Santucci et al. ............ 174/68.3 |
| 5,728,976 A | * | 3/1998 | Santucci et al. ............ 174/68.3 |
| 5,942,729 A | * | 8/1999 | Carlson et al. ............. 174/68.1 |
| 6,107,576 A | * | 8/2000 | Morton et al. ............... 174/101 |
| 6,284,974 B1 | * | 9/2001 | Albert et al. ............... 174/68.3 |
| 6,323,421 B1 | | 11/2001 | Pawson et al. |
| 6,333,461 B1 | * | 12/2001 | Marcou et al. ............. 174/68.3 |
| 6,380,484 B1 | * | 4/2002 | Theis et al. ................. 174/68.3 |
| 6,437,243 B1 | * | 8/2002 | VanderVelde et al. ...... 174/68.3 |
| 6,437,244 B1 | | 8/2002 | VanderVelde |
| 6,459,038 B1 | * | 10/2002 | Waszak et al. ................. 174/48 |

* cited by examiner

*Primary Examiner*—Dean A. Reichard
*Assistant Examiner*—Angel R. Estrada
(74) *Attorney, Agent, or Firm*—Robert A. McCann; Aimee E. McVady (57) ABSTRACT

A hinged duct system having a base and a cover hingedly attached to the base. The base has a bottom wall, a first sidewall and a second sidewall that define a channel therebetween. The cover has a top wall, a first end portion and a second end portion. The cover is attached to one of the sidewalls of the base by a hinge mechanism. The hinge mechanism has a hook member located at a distal end of one of the sidewalls of the base and a hook member located at one of the end portions of the cover. A flexible member is disposed along the hinge mechanism to preventing the cover from sliding with respect to the base when the cover rotates about the base.

26 Claims, 7 Drawing Sheets

HINGED AND LATCHED RACEWAY

FIELD OF THE INVENTION

The present invention relates to a wiring cable duct system including a base and a cover, and more particularly to a wiring cable duct system having a cover attached to the base by a hinge mechanism on one side to allow the cover to rotate for easy access in the raceway and a latch mechanism on the opposite side to secure the cover when in a closed position.

BACKGROUND OF THE INVENTION

A wide variety of wiring duct and raceway systems are known for routing various types of wires and cables. Typical duct or raceway systems consist of a base member and a cover that may be hinged, snap latched or otherwise engageable with the base. In operation, it often becomes necessary to remove or open the cover to allow access to the cable containing area of the base member. Frequently, an installer needs to repair, reconfigure or install new cables in the raceway system. Removal, storage and replacement of the cover over the entire system during this process can be time consuming and otherwise problematic. Therefore, many raceway systems use a hinged duct cover with the base. However, certain duct covers suffer from the inability to remain aligned with the base and tend to slide axially with respect to the base when the cover is rotated away from the base.

SUMMARY OF THE INVENTION

The present invention is directed to a hinged duct system having a base member and a cover. The base member has a bottom wall, a first sidewall and a second sidewall. The base member also includes a channel located between the sidewalls. The cover has a top wall, a first end portion and a second end portion. The cover is hingedly attached to one of the sidewalls of the base member by a hinge mechanism. The hinge mechanism has a hook member located at a distal end of one of the sidewalls of the base and a hook member located at one of the end portions of the cover. The hinge mechanism enables the cover to rotate about the base. A flexible member is disposed along the hinge mechanism to prevent the cover from sliding with respect to the base.

Additionally, one of the sidewalls of the base of the hinged duct system has a protrusion that extends from an edge of the sidewall. The protrusion limits the rotation of the cover with respect to the base as the cover rotates about the base.

BRIEF DESCRIPTION OF THE DRAWINGS

The features and advantages of this invention will become apparent from the following description of preferred embodiments with reference to the accompanying drawings, wherein.

DETAILED DESCRIPTION OF PREFERRED EMBODIMENTS

Figure 1:
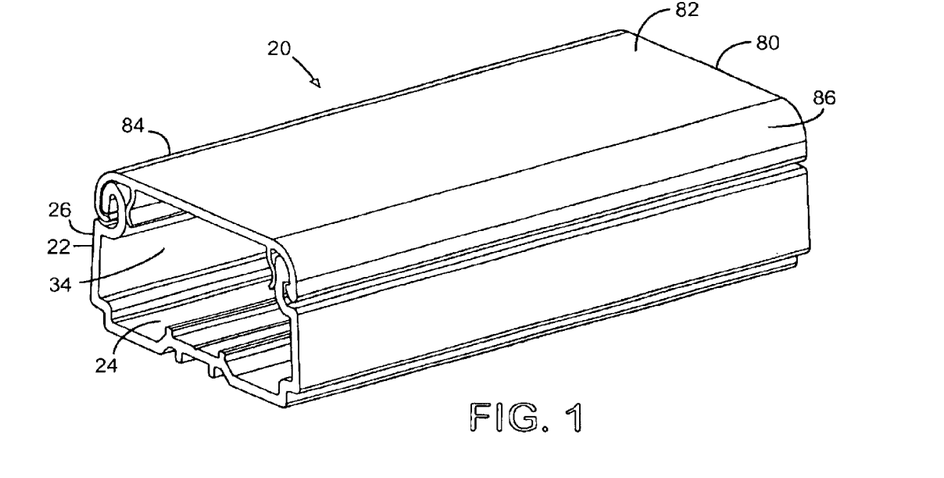
FIG. 1 is a perspective view of one embodiment of the hinged and latched raceway according to the present invention.

One embodiment of the hinged and latched raceway or duct 20 of the present invention is illustrated in FIGS. 1–9. A second embodiment of the hinged and latch raceway is illustrated in FIGS. 10–15. As illustrated in FIGS. 1 and 10, each embodiment of the raceway includes a base 22 and a cover 80 that is secured to the base 22 by a hinge mechanism on one side and a latch mechanism on the opposite side. The raceway may be formed from any suitable material, but is preferably formed from a plastic material, such as PVC.

Figure 2:
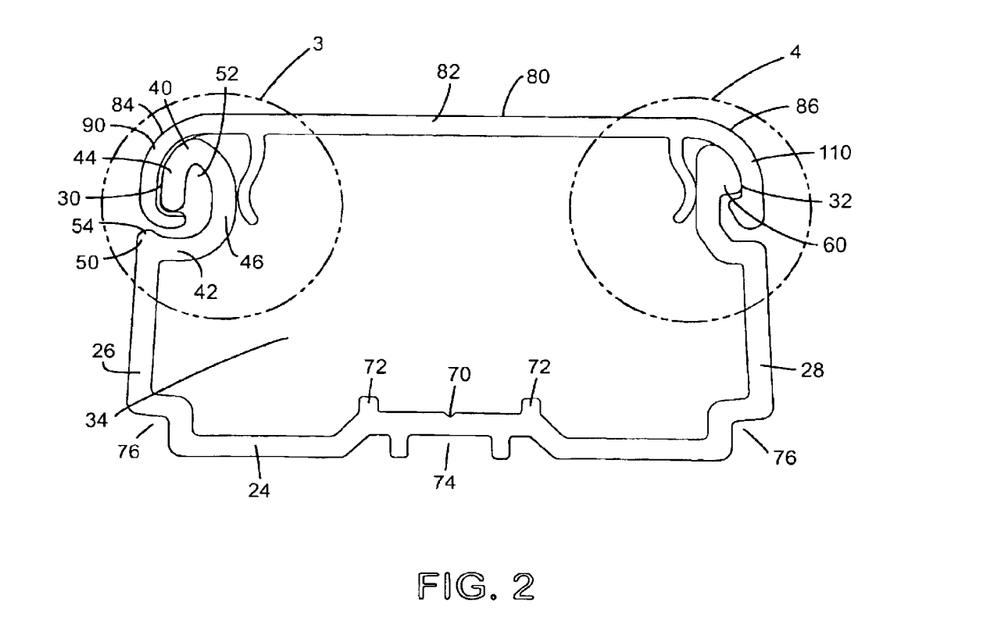
FIG. 2 is a front view of the hinged and latched raceway illustrated in FIG. 1.

As shown in FIG. 2, the base 22 has a bottom wall 24 and first and second sidewalls 26, 28 which may be integrally formed or otherwise affixed together. The bottom wall 22 and the sidewalls 26, 28 define a receiving channel 34 for wires or the like. The distal end 30 of the first sidewall 26 includes a hook 40 that forms part of the hinge mechanism. The hook 40 includes a flange 42 that extends inwardly into the receiving channel 34 from an edge 50 of the sidewall. The hook 40 also has an inverted generally J-shape with a straight portion 44 and a curved portion 46. The flange 42, straight portion 44 and the curved portion 46 define a cavity 52 therebetween.

The first sidewall 26 also includes a bump or protrusion 54 that extends upwardly from the edge 50 of the sidewall such that it is positioned above the flange 42 and is located at the opening of the cavity 52 formed by the J-shaped hook 40. As will be described with respect to FIGS. 7–9, the protrusion 54 prevents the cover 80 from rotating beyond 90° with respect to the base 22.

The distal end 32 of the second sidewall 28 includes a latch 60 that forms part of the latch mechanism. The latch 60 has a bottom portion with an angled wall 62 that is directed inwardly towards the channel 34 and a top portion with a single arrowhead 64 that is directed outwardly from the channel 34. The second sidewall 28 also includes a step 66 that leads to the angled wall 62 of the latch 60.

The bottom wall 24 of the base 22 includes a plurality of pre-punched holes, not illustrated, to aid in the installation of the raceway. The inner surface of the bottom wall 24 may also include a groove 70 located along the center of the base to aid in the positioning of a drill for installing the raceway, if desired. The inner surface of the bottom wall includes an upwardly extending rib 72 positioned on either side of the pre-punched holes and the center groove. The ribs 72 protect the wires positioned in the raceway from being damaged by the heads of the screws that are used to install the raceway.

The outer surface of the bottom wall 24 is configured to enable the raceway to be mounted to fittings on the walls, floors or the like. The outer surface includes a recess 74 at the center of the bottom wall 24 and a notch 76 at the bottom of each of the sidewalls 26, 28. The recess 74 and the notches 76 accommodate the fittings used to install the raceway.

FIG. 2 also illustrates the cover installed on the base. The cover 80 includes a generally planar top wall 82 and a curved first and second end portion 84, 86. The first end portion 84 includes a hook 90 for engaging the hook 40 at the distal end 30 of the first sidewall 26 of the base 22. A finger 98 is formed on the cover and spaced inwardly from the hook 90 so as to define an opening 102 therebetween. The opening 102 accommodates the hook 40 located at the distal end 30 of the first sidewall 26 when the cover is installed on the base. The second end portion 86 includes a latch 110 for engaging the latch 60 at the distal end 32 of the second sidewall 28. A finger 114 is formed on the cover and spaced inwardly from the latch 110 so as to define an opening 118. The opening 118 accommodates the latch 60 at the distal end 32 of the second sidewall 28 when the cover is installed on the base.

Figure 3:
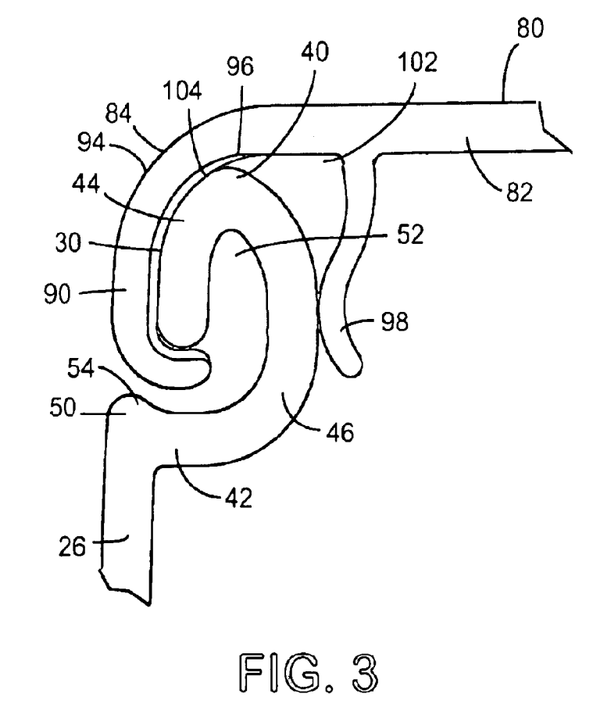
FIG. 3 is a partial enlargement of the hinge mechanism of the raceway illustrated in FIG. 1.
Figure 4:
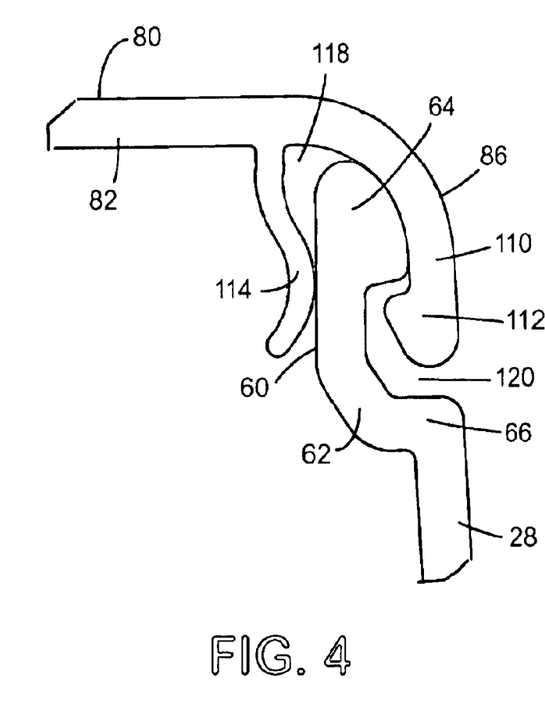
FIG. 4 is a partial enlargement of the latch mechanism of the raceway illustrated in FIG. 1.
Figure 5:
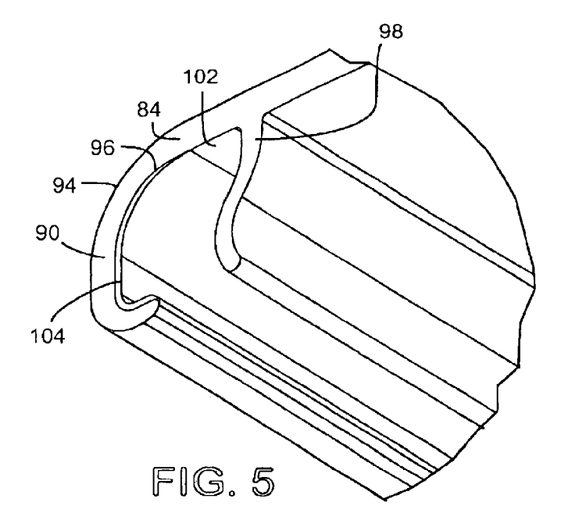
FIG. 5 is a perspective view of the hinge mechanism with a flexible vinyl member disposed on the cover of the raceway illustrated in FIG. 1.
Figure 6:
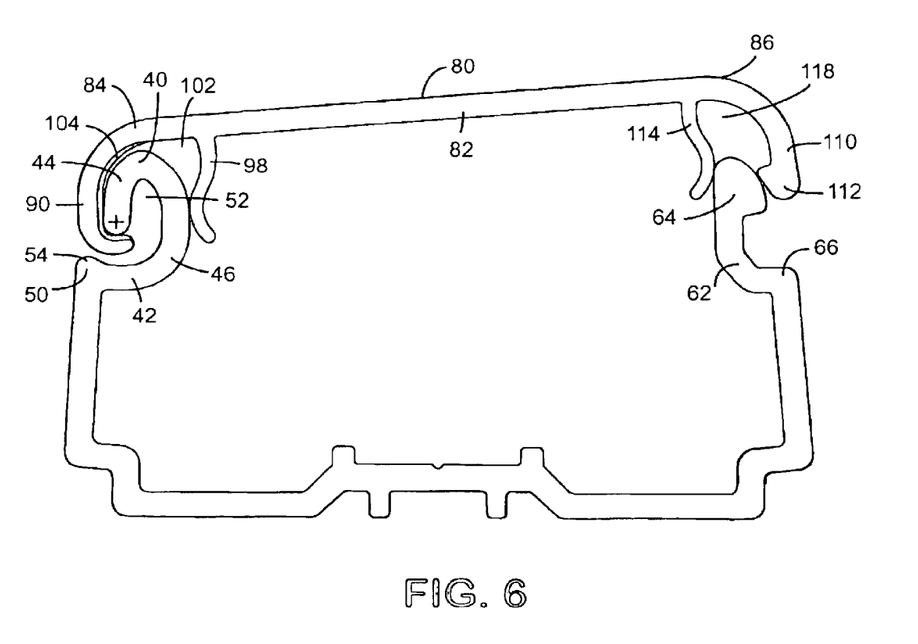
FIG. 6 is a front view of the raceway system of FIG.1 with the latch mechanism released.

FIGS. 3 and 4 illustrate an enlarged view of the hinge mechanism and the latch mechanism of the present invention, respectively. As shown in FIGS. 3 and 5, the hook 90 at the first end portion 84 of the cover is generally C-shaped. The generally C-shaped hook 90 engages the straight portion 44 of the generally J-shaped hook 40 of the first sidewall 26 when the cover 80 is in a closed position over the base.

The raceway includes a layer of a co-extruded flexible member 104 that extends the length of the raceway. The flexible member is formed from a vinyl material. The raceway embodiment illustrated in FIGS. 1–9 features the layer of the flexible member disposed on the inner surface 96 of the C-shaped hook 90. When the cover 80 is installed on the base 22, the flexible vinyl member 104 on the inner surface of the C-shaped hook 90 engages the straight portion 44 of the J-shaped hook 40 of the first sidewall 26. As the cover 80 is rotated, the flexible vinyl member 104 and the C-shaped hook 90 enter the cavity 52 defined by the J-shaped hook 40 and continue to engage the straight portion 44 of the J-shaped hook 40. The layer of the flexible vinyl member 104 provides an Interference between the base hook 40 and the cover hook 90 that form the hinge mechanism. As a result, the flexible vinyl member 104 prevents the cover 80 from sliding axially with respect to the base.

The finger 98 is curved so that a portion of the finger may contact the curved portion 46 of the J-shaped hook when the J-shaped hook 40 is disposed in the opening 102 between the finger 98 and the C-shaped hook 90. The finger 98 is always in a pre-loaded condition to insure that the hinge mechanism has secured the cover 80 to the base 22. The finger 98 also insures that the hinge mechanism is able to smoothly rotate the cover 80.

As shown in FIG. 4, the latch 110 at the end portion 86 of the cover 80 includes a downwardly extending single arrowhead 112 that faces inwardly towards the C-shaped hook 90 at the opposite end portion 84 of the cover 80. The arrowhead 112 of the cover latch 110 is similar to the single arrowhead 64 of the base latch 60 except that the cover arrowhead has been rotated 180 degrees so that the arrowheads are able to interlock. The finger 114 spaced from the latch 110 also has a smooth curved radius surface that is always under tension when it engages the base latch 60 positioned in the opening 118 to insure that the latch mechanism is secure.

To install the cover on the base of the raceway, the C-shaped hook 90 at the first end portion 84 of the cover 80 is aligned with the J-shaped hook 40 at the distal end 30 of the first sidewall 26. Next, the C-shaped hook 90 is pushed down until it snap locks into position on the J-shaped hook 40. As a result, the finger 98 engages the curved portion 46 of the J-shaped hook 40 and the C-shaped hook 90 with the flexible vinyl member 104 engages the straight portion 44 of the J-shaped hook 40. The latch 110 at the second end portion 86 of the cover 80 also snaps into a locking engagement with the latch 60 at the second sidewall 28 of the base 22. As a result, the arrowheads 112, 64 of each latch 110, 60, respectively, interlock and the finger 114 engages the back side of the latch 60 of the second side wall 28 to ensure that the cover 80 is locked in a closed position.

As shown in FIGS. 1, 2 and 4, when the cover 80 is secured to the base 22, the latching mechanism defines a slot or opening 120 between the cover latch 110 and the base latch 60. The slot 120 accommodates a screwdriver or other flat tool to enable the cover 80 to be removed from the base 22 by separating the cover latch 110 from the base latch 60 to disengage the latching mechanism. Once the latching mechanism has been disengaged, the cover 80 may be rotated away from the base 22. Also shown in FIGS. 1 and 2, the protrusion 54 on the first side wall 26 prevents or prohibits access into the hinge mechanism with a screwdriver or other flat tool. As a result, the first end portion 84 of the cover 80 may not be removed from the base 22 by a screwdriver or other flat tool.

Figure 7:
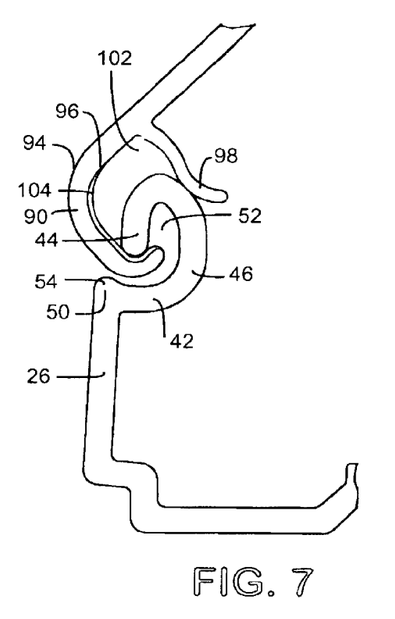
FIG. 7 is a front view of the raceway system of FIG. 1 with the cover rotated away from the base.
Figure 8:
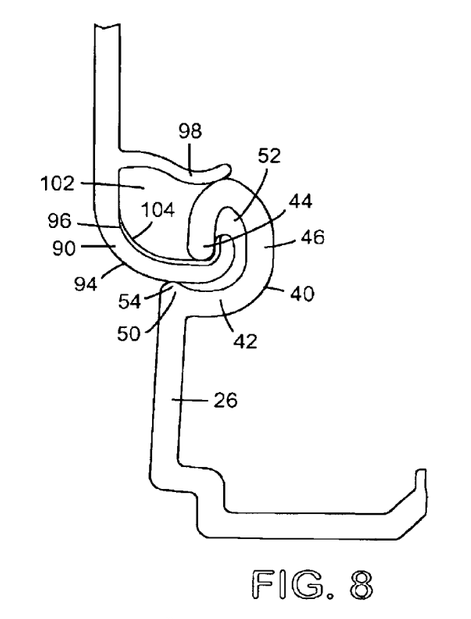
FIG. 8 is a front view of the raceway system of FIG. 1 with the cover rotated to a 90° angle with respect to the base.
Figure 9:
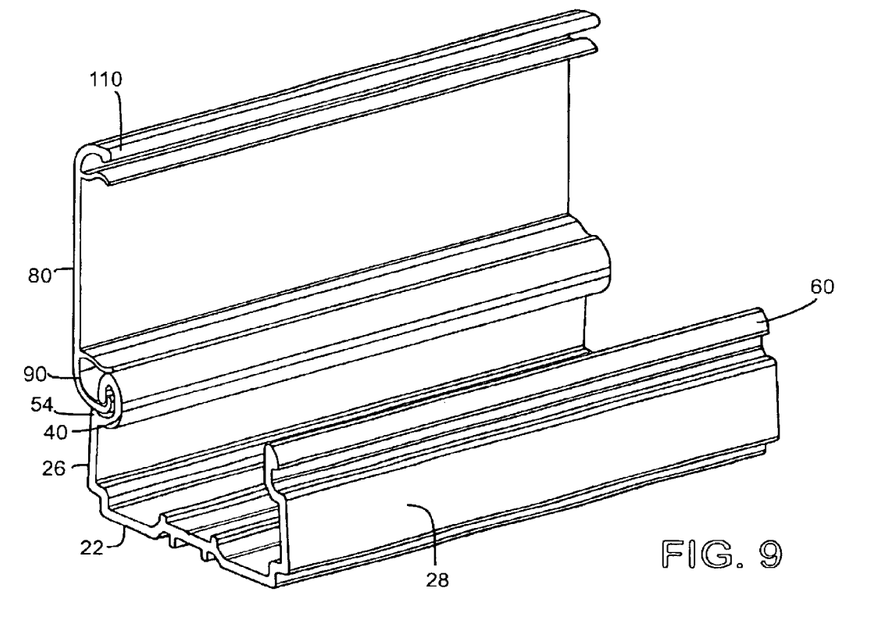
FIG. 9 is a perspective view of the raceway system of FIG. 1 with the cover maintained at a 90° angle with respect to the base.
Figure 10:
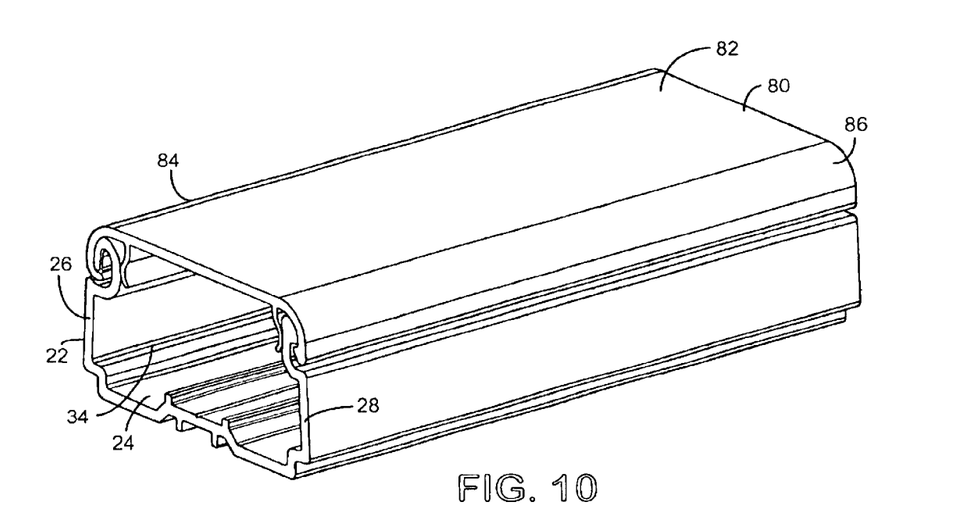
FIG. 10 is a perspective view of a second embodiment of the hinged and latched raceway according to the present invention.
Figure 11:
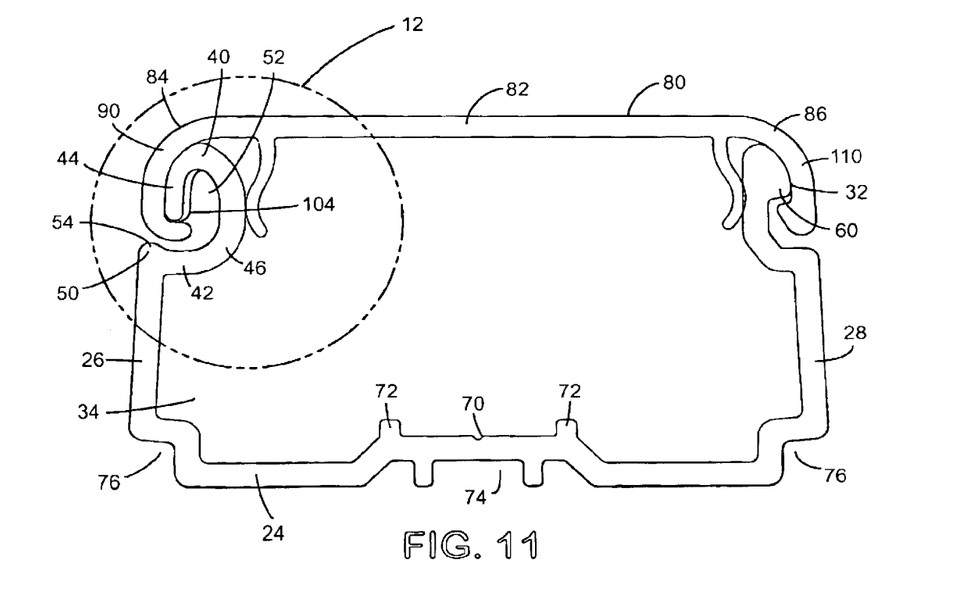
FIG. 11 is a front view of the hinged and latched raceway illustrated in FIG. 10.
Figure 12:
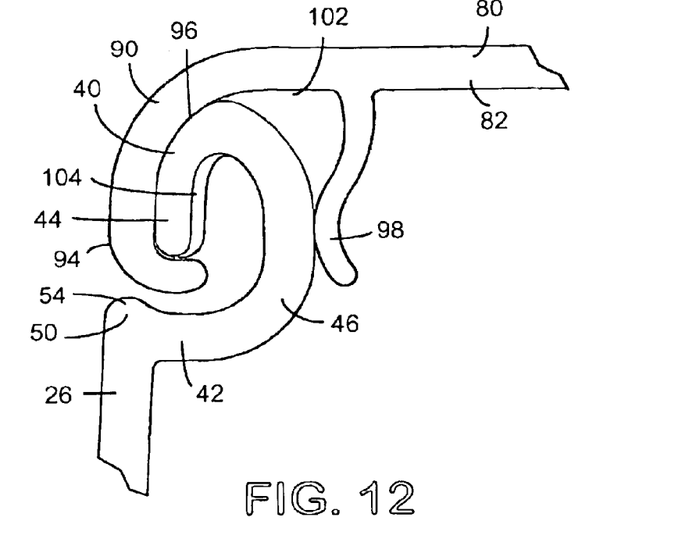
FIG. 12 is a partial enlargement of the hinge mechanism of the raceway illustrated in FIG. 10.
Figure 13:
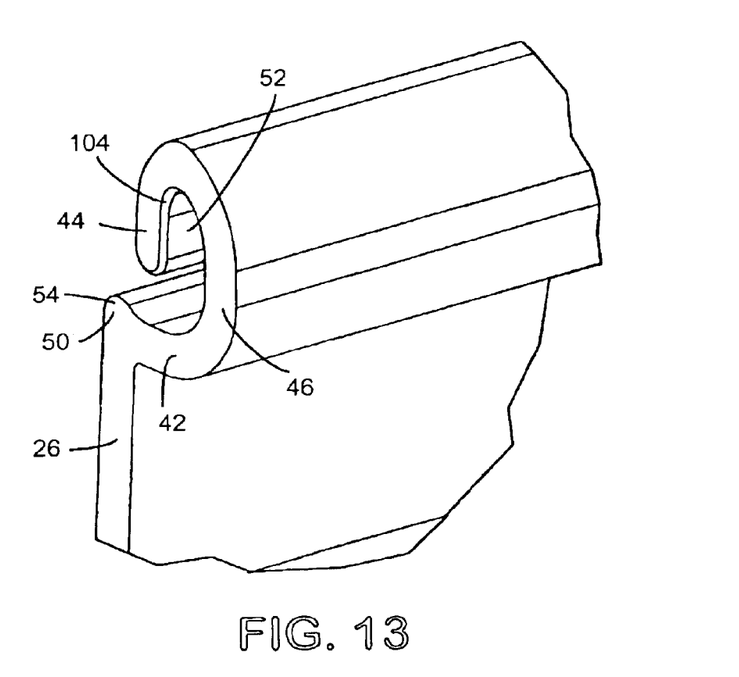
FIG. 13 is a perspective view of the hinge mechanism with a flexible vinyl member disposed on the base of the raceway illustrated in FIG. 10.

As shown in FIGS. 7–9, as the cover 80 is rotated, the C-shaped hook 90 enters the cavity 52 defined by the generally J-shaped hook 40 of the first sidewall 26 of the base 22 and the finger 98 follows the curved portion 46 of the J-shaped hook 40 such that a portion of the finger 98 is continuously in contact with the J-shaped hook 40. Once the cover 80 has rotated 90 degrees, the C-shaped hook 90 contacts protrusion 54. The protrusion 54 prevents the cover 80 from rotating beyond 90 degrees with respect to the base 22. Additionally, as discussed above, the straight portion 44 of the J-shaped hook 40 contacts the flexible vinyl member 104 so that when the cover 80 is disposed at 90 degrees, the flexible vinyl member 104 prevents the cover 80 from sliding with respect to the base.

Figure 14:
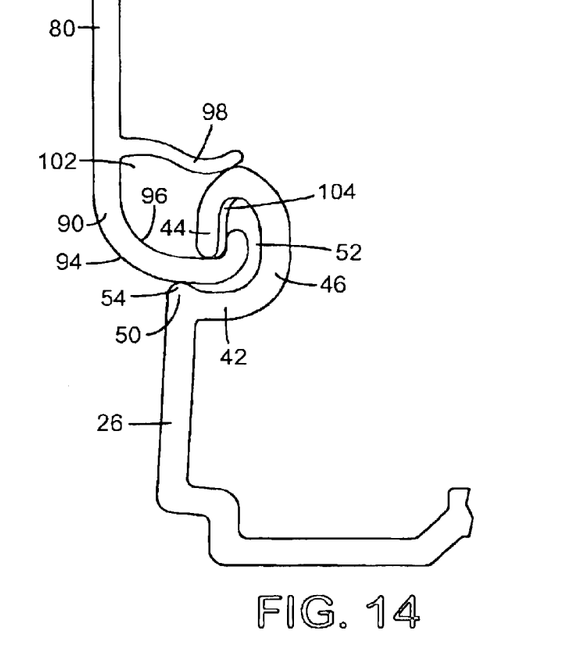
FIG. 14 is a front view of the raceway system of FIG. 10 with the cover rotated to a 90° angle with respect to the base.
Figure 15:
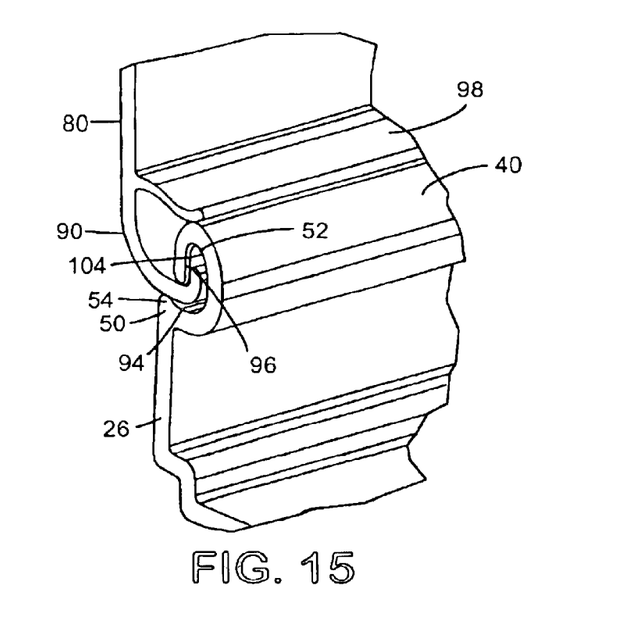
FIG. 15 is a perspective view of the raceway system of FIG. 10 with the cover maintained at a 90° angle with respect to the base.

Alternatively, as illustrated in the raceway embodiment of FIGS. 10–15, the layer of the flexible vinyl member 104 may be positioned on the inverted generally J-shaped hook 40 of the first sidewall 26 of the base 22. Preferably, the flexible member 104 is positioned within the cavity 52 along the straight portion 44 of the J-shaped hook 40. The flexible member 104, however, may be positioned elsewhere along the J-shaped hook to prevent the cover from sliding with respect to the base. FIGS. 14–15 illustrate the cover 80 rotated away from the base 22 with a portion of the C-shaped hook 90 engaging the flexible vinyl member 104 positioned on the straight portion 44 of the J-shaped hook 40. As discussed above, the flexible vinyl member 104 prevents the cover 80 from sliding with respect to the base 22.

The embodiments of the hinged and latched raceway may also include a two sided pressure sensitive tape or adhesive that is positioned along the outer surface of the bottom wall of the base. The pressure sensitive tape provides a means of installing the raceway to the wall, floor or like when using communication wires. For power applications, the pressure sensitive tape facilitates positioning the raceway during installation.

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation. The actual scope of the invention is intended to be defined in the following claims when viewed in their proper perspective based on the prior art.

What is claimed is:

1. A hinged duct system comprising:
   a base member with a bottom wall and first and second sidewalls defining a channel therebetween; and
   a cover hingedly attached to one of the sidewalls of the base member by a hinge mechanism, the cover having a top wall and first and second end portions, the hinge mechanism having a hook member located at a distal end of one of the sidewalls of the base and a hook member located at one of the end portions of the cover, wherein a layer of a flexible member is disposed along the hinge mechanism for preventing the cover from sliding with respect to the base.

2. The hinged duct system of claim 1, wherein the layer of the flexible member is positioned along the hook member of one of the end portions of the cover.

3. The hinged duct system of claim 2, wherein the layer of the flexible member is positioned along an inner surface of the hook member of one of the end portions of the cover.

4. The hinged duct system of claim 1, wherein the layer of the flexible member is positioned along the hook member of one of the sidewalls of the base.

5. The hinged duct system of claim 4, wherein the hook member of the sidewall has a generally straight portion and a generally curved portion, the layer of the flexible member is positioned along the generally straight portion of the hook member of the sidewall of the base.

6. The hinged duct system of claim 1, wherein the layer of the flexible member is co-extruded.

7. The hinged duct system of claim 1, wherein the layer of the flexible member extends the length of the duct system.

8. The hinged duct system of claim 1, wherein the layer of the flexible member is made of vinyl.

9. A hinged duct system comprising:
   a base member with a bottom wall and first and second sidewalls defining a channel therebetween, a distal end of one of the sidewalls having a hook member;
   a cover hingedly attached to one of the sidewalls of the base member, the cover having a top wall and first and second end portions, one of the end portions having a hook member for engaging the hook member of the sidewall; and
   a layer of a flexible member disposed on the hook member of the end portion of the cover for preventing the cover from sliding with respect to the base.

10. The hinge duct system of claim 9, wherein the layer of the flexible member is disposed on an inner surface of the hook member of the end portion.

11. The hinge duct system of claim 9, wherein a distal end of one of the sidewalls of the base has a latch member and one of the end portions of the cover has a latch member for engaging the latch member of the sidewall.

12. The hinged duct system of claim 11, wherein the latch member of the sidewall is a single arrowhead and the latch member of the end portion is a single arrowhead.

13. The hinged duct system of claim 11, wherein when the cover is positioned on the base, the latch member of the second side wall and the latch member of the second end portion engage thereby defining a slot between the cover and the base for accommodating a tool to facilitate disengagement of the latch members.

14. The hinged duct system of claim 11, wherein the cover has downwardly extending fingers positioned inwardly of the hook member and the latch member to define openings therebetween.

15. The hinged duct system of claim 9, wherein the first sidewall includes a protrusion extending from an edge of the sidewall, whereby when the cover rotates about the base, the protrusion limits the rotation of the cover with respect to the base.

16. The hinged duct system of claim 9, wherein the hook member of the sidewall is generally J-shaped with an inwardly extending flange, a straight portion and a curved portion.

17. The hinged duct system of claim 9, wherein the hook member of the end portion is C-shaped.

18. A hinged duct system with a cover, wherein the system comprises:
   a base member with a bottom wall and first and second sidewalls defining a channel therebetween, a distal end of one of the sidewalls having a hook member;
   a cover hingedly attached to one of the sidewalls of the base member, the cover having a top wall and first and second end portions, one of the end portions having a hook member for engaging the hook member of the sidewall; and
   a layer of a flexible member disposed on the hook member of the sidewall of the base for preventing the cover from sliding with respect to the base.

19. The hinge duct system of claim 18, wherein the hook member of the sidewall has a generally straight portion and a generally curved portion, the layer of the flexible member is positioned along the generally straight portion of the hook member of the sidewall of the base.

20. The hinge duct system of claim 18, wherein a distal end of one of the sidewalls of the base has a latch member and one of the end portions of the cover has a latch member for engaging the latch member of the sidewall.

21. The hinged duct system of claim 20, wherein the latch member of the sidewall is a single arrowhead and the latch member of the end portion is a single arrowhead.

22. The hinged duct system of claim 20, wherein when the cover is positioned on the base, the latch member of the second side wall and the latch member of the second end portion engage thereby defining a slot between the cover and the base for accommodating a tool to facilitate disengagement of the latch members.

23. The hinged duct system of claim 20, wherein the cover has downwardly extending fingers positioned inwardly of the hook member and the latch member to define openings therebetween.

24. The hinged duct system of claim 18, wherein the first sidewall includes a protrusion extending from an edge of the sidewall, whereby when the cover rotates about the base, the protrusion limits the rotation of the cover with respect to the base.

25. The hinged duct system of claim 18, wherein the hook member of the sidewall is generally J-shaped with an inwardly extending flange, a straight portion and a curved portion.

26. The hinged duct system of claim 18, wherein the hook member of the end portion is C-shaped.

* * * * *